United States Patent
Afsahi et al.

(10) Patent No.: US 9,780,828 B2
(45) Date of Patent: Oct. 3, 2017

(54) INTEGRATED TRANSMIT/RECEIVE SWITCH WITH POWER AMPLIFIER TRANSFORMER REUSE

(71) Applicant: Avago Technologies General IP (Singapore) Pte. Ltd., Singapore (SG)

(72) Inventors: Ali Afsahi, San Diego, CA (US); Hongrui Wang, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/087,322

(22) Filed: Mar. 31, 2016

(65) Prior Publication Data

US 2017/0250728 A1    Aug. 31, 2017

Related U.S. Application Data

(60) Provisional application No. 62/300,658, filed on Feb. 26, 2016.

(51) Int. Cl.
*H04B 1/44* (2006.01)
(52) U.S. Cl.
CPC ...................... *H04B 1/44* (2013.01)
(58) Field of Classification Search
CPC ........................................ H04B 1/44
USPC ........................................... 455/78
See application file for complete search history.

(56) References Cited

U.S. PATENT DOCUMENTS

| | | | |
|---|---|---|---|
| 7,738,568 B2 * | 6/2010 | Alfano | H01L 23/66 375/258 |
| 9,503,160 B1 * | 11/2016 | Hyde | H04B 5/0087 |
| 2014/0113828 A1 * | 4/2014 | Gilbert | H01L 39/126 505/100 |
| 2014/0139042 A1 * | 5/2014 | Choksi | H04B 1/18 307/112 |

* cited by examiner

Primary Examiner — April G Gonzales
(74) Attorney, Agent, or Firm — Sterne, Kessler, Goldstein & Fox P.L.L.C.

(57) ABSTRACT

A transmit/receive switch architecture is provided which reuses a power amplifier's transformer as part of the low noise amplifier (LNA) input matching network. A front-end circuit includes a transmit/receive switch. The transmit/receive switch includes a transformer that includes primary winding and secondary winding. The transmit/receive also includes a transistor, where a drain of the transistor is connected to the secondary winding and a gate of the transistor is configured to receive a control signal. The transmit/receive switch operates as a receive switch when the control signal is low and inputs of the primary winding are either shorted or at open circuit. The transmit/receive switch operates as a transmit switch when the control signal is high.

20 Claims, 6 Drawing Sheets

FIG. 2A
Conventional

FIG. 2B
Conventional

FIG. 2C
Conventional

INTEGRATED TRANSMIT/RECEIVE SWITCH WITH POWER AMPLIFIER TRANSFORMER REUSE

CROSS REFERENCE TO RELATED APPLICATIONS

The present application claims the benefit of U.S. Provisional Patent Application No. 62/300,658, filed on Feb. 26, 2016, which is hereby incorporated by reference in its entirety.

BACKGROUND

Field

The present disclosure relates generally to an integrated transmit/receive (T/R) switch for a wireless device.

Background Art

Transmit/Receive (T/R) switches are one of the key building blocks in time-division duplexing (TDD) wireless communication systems. Most high-performance radio frequency (RF) integrated-circuit (RFIC) switches have been implemented using Gallium Arsenide (GaAs) processes for high power-handling and low insertion loss. To reduce the bill of material (BOM) cost and realize final system on chip (SOC) solution, it is desirable to integrate the T/R switch onto complementary metal-oxide semiconductor (CMOS) process. However, it is quite challenging to design a CMOS switch with low insertion loss, high linearity, and high isolation compared to external T/R solutions especially at GHz frequencies. Recently, various CMOS T/R switches have been investigated and developed for wireless applications. However, these switches still have issues to achieve good transmitter (TX) efficiency and good receiver (RX) noise figure while maintaining the isolation between TX and RX.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

A CMOS T/R switch architecture is provided which reuses the PA transformer as part of the low noise amplifier (LNA) input matching network. The insertion loss in TX mode is improved and chip area is saved while the isolation is maintained.

According to one embodiment of the disclosure, a front-end circuit includes a transmit/receive switch. The transmit/receive (T/R) switch includes a transformer that includes a primary winding and a secondary winding. The T/R switch further includes a transistor, where a drain of the transistor is connected to the secondary winding and a gate of the transistor is configured to receive a control signal. The T/R switch operates as a receive switch when the control signal is low and inputs of the primary winding are shorted. The T/R switch operates as a transmit switch when the control signal is high.

According to another embodiment of the disclosure, a front-end circuit includes a transmit/receive switch. The transmit/receive (T/R) switch includes a transformer that includes a primary winding and a secondary winding. The T/R switch further includes a transistor, where a drain of the transistor is connected to the secondary winding and a gate of the transistor is configured to receive a control signal. The T/R switch operates as a receive switch when the control signal is low and inputs of the primary winding are at open circuit. The T/R switch operates as a transmit switch when the control signal is high.

DETAILED DISCUSSION

The following Detailed Description of the present disclosure refers to the accompanying drawings that illustrate exemplary embodiments consistent with this disclosure. The exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specification and International Mobile Telecomunnications-2000 (IMT-2000) standard, all of which are incorporated by reference in their entirety. Further, although exemplary embodiments are described with reference to LTE, the more generic terms "mobile device" and "base station" are used herein except where otherwise noted to refer to the LTE terms "User Equipment (UE)" and "eNodeB/eNB," respectively.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) WLAN (IEEE 802.11), Bluetooth or Bluetooth Low Energy (BLE) standards, Near-field Communication (NFC) (ISO/IEC 18092), ZigBee (IEEE 802.15.4), and/or Radio-frequency identification (RFID), to provide some examples. These various standards and/or protocols are each incorporated by reference in their entirety.

Figure 1:
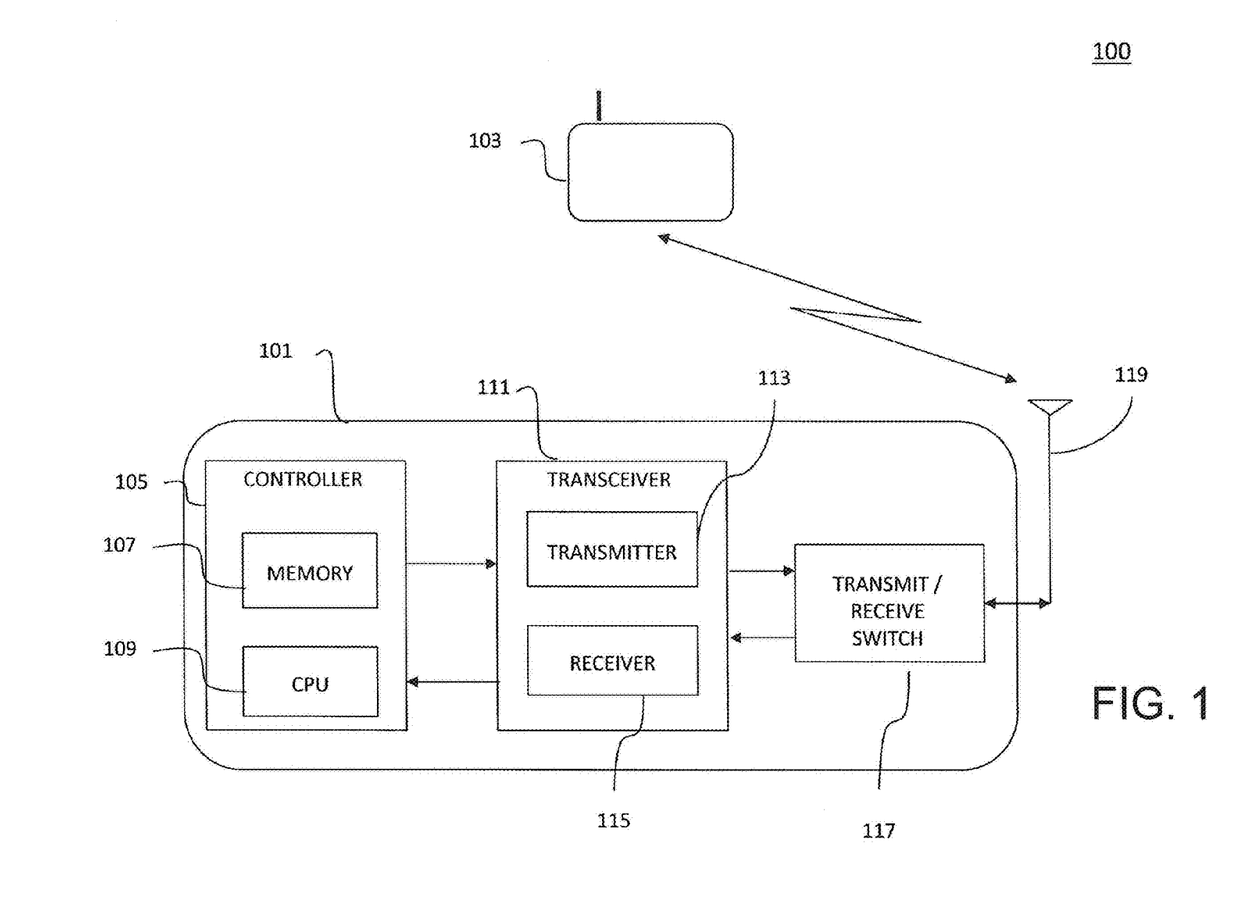
FIG. 1 illustrates an example communication environment, in accordance with an embodiment of the present disclosure.

FIG. 1 illustrates an example communication environment 100 that includes a devices 101 and 103, in accordance with an embodiment of the present disclosure. Devices 101 and 103 each include suitable logic, circuitry, and/or code that is configured to communicate via one or more wireless technologies. According to one example, device 101 can include a user equipment (UE) that can communicate with other devices such as device 103. UE 101 can further be configured to support co-existing wireless communications. UE 101 can include, for example, a transceiver having suitable logic, circuitry, and/or code that is configured to transmit and/or receive wireless communications via one or more wireless technologies within the communication environment 100. Device 103 can include a base station, an access point, a mobile device (e.g. another UE) etc. In one example, device 103 can include suitable logic, circuitry, and/or code that is configured to: (1) receive one or more wired communications via one or more well-known wired technologies (e.g., within a core backhaul network) and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies within a core network, and (3) to transmit and/or receive wireless communications via one or more wireless technologies within the communication environment 100. The wireless technologies can include one or more wireless protocols discussed above.

The UE 101 can be configured to communicate with a base station, such as device 103, in a serving cell or sector of the communication environment 100, and/or to communicate with an access point (AP), such as device 103, in a wireless local area network (WLAN). For example, UE 101 receives signals on one or more downlink (DL) channels and transmits signals to the base station and/or the AP on one or more respective uplink (UL) channels. In an exemplary embodiment, the base station includes suitable logic, circuitry, and/or code that is configured for communications conforming to 3GPP's Long-Term Evolution (LTE) specification (e.g., the base station is an LTE base station), the AP includes suitable logic, circuitry, and/or code that is configured for communications conforming to IEEE's 802.11 WLAN specification (e.g., the AP is a WLAN access point), and UE 101 includes suitable logic, circuitry, and/or code that is configured for communications conforming to 3GPP's LTE specification and IEEE's 802.11 WLAN specification. That is, UE 101 includes suitable logic, circuitry, and/or code is configured to wirelessly communicate with the base station utilizing 3GPP's LTE specification and with the AP utilizing IEEE's 802.11 WLAN specification. Here, the serving cell or sector can be an LTE serving cell or sector and the WLAN can be a WLAN utilizing the 802.11 WLAN specification.

Examples of UE 101 include (but are not limited to) a mobile computing device such as a laptop computer, a tablet computer, a mobile telephone or smartphone, a "phablet," a personal digital assistant (PDA), mobile media player, and the like; and a wearable computing device-such as a computerized wrist watch or "smart" watch, computerized eyeglasses, and the like. In some embodiments, device 101 can be a stationary device, including, for example, a stationary computing device-such as a personal computer (PC), a desktop computer, a computerized kiosk, an automotive/aeronautical/maritime in-dash computer terminal, and the like.

As illustrated in FIG. 1, device 101, according to an exemplary embodiment of the present disclosure, can include a transceiver 111 communicatively coupled to a controller 105 and a transmit/receive (T/R) switch 117.

Transceiver 111 includes suitable logic, circuitry, and/or code that is configured to transmit and/or receive wireless communications via one or more wireless technologies within the communication environment 100. In particular, the transceiver 111 can include a transmitter 113 and a receiver 115 that have suitable logic, circuitry, and/or code configured to transmit and receive wireless communications, respectively, via one or more antennas 119. Those skilled in the relevant art(s) will recognize that the processes for transmitting and/or receiving wireless communications can include (but are not limited to) digital signal processing using a digital signal processor (DSP), modulation and/or demodulation of data using a respective modulator or and/or demodulator, digital-to-analog and/or analog-to-digital conversion using a respective digital-to analog converter (DAC) or analog-to-digital converter (ADC), and/or frequency conversion using one or more mixers, local oscillators, to provide some examples. Further, those skilled in the relevant art(s) will recognize that the antenna 119 may include an integer array of antennas, and that the antenna 119 may be capable of both transmitting and receiving wireless communication signals. For example, device 101 can be configured for wireless communication utilizing a Multiple-input Multiple-output (MIMO) configuration. In an exemplary embodiment, the transceiver 111 can be configured for wireless communications conforming to one or more wireless protocols defined by 3GPP (e.g., 3GPP's LTE specification), one or more non-3GPP protocols (e.g., IEEE's 802.11 WLAN specification), Bluetooth or Bluetooth Low Energy (BLE) standards, etc.

Although one transceiver, one T/R switch, one controller, and one antenna are shown, those skilled in the relevant art(s) will recognize that device 101 can include one or more transceivers, one or more T/R switches, one or more controllers, and/or one or more antennas that can be used in accordance to one or more communication protocols and/or standards. Additionally or alternatively one transceiver and/or one antenna could be used in accordance to one or more communication protocols and/or standards.

Controller 105 includes suitable logic, circuitry, and/or code that is configured to control the overall operation of device 101, including the operation of the transceiver 111. Controller 105 can include one or more processors (e.g., CPUs) 109 configured to carry out instructions to perform arithmetical, logical, and/or input/output (I/O) operations of device 101 and/or one or more components of device 101. Controller 105 can further include a memory 107 that includes suitable logic, circuitry, and/or code that is configured to store data and/or instructions, including instructions that when executed by processor 109 perform the functionality described herein. The memory 107 can be any well-known volatile and/or non-volatile memory, including, for example, read-only memory (ROM), random access memory (RAM), flash memory, a magnetic storage media, an optical disc, erasable programmable read only memory (EPROM), programmable read only memory (PROM) or other hardware memory. The memory 107 can be non-removable, removable, or a combination of both.

T/R switch 117 includes suitable logic, circuitry, and/or code that is configured to connect transceiver 111 to antenna 119. In one example, UE 101 can operate based on a time division duplex (TDD) wireless communication protocol, where at any instant of time UE 101 can either transmit or receive a respective communication signal. In this example, when transceiver 111 is configured to operate as a receiver, T/R switch 117 is configured to connect receiver 115 to antenna 119 for wireless signal reception. When transceiver 111 is configured to operate as a transmitter, T/R switch 117 is configured to connect transmitter 113 to antenna 119 for wireless signal transmission. Although T/R switch 117 is illustrated as a separate block, it is noted that T/R switch 117 can also be part of transceiver 111 and/or reuse some circuits and/or parts of some circuits of transceiver 111, as will be shown in detail below.

Although exemplary details of device 101 is illustrated in FIG. 1, it is noted that device 103 can includes similar structures and circuits.

Figure 2A:
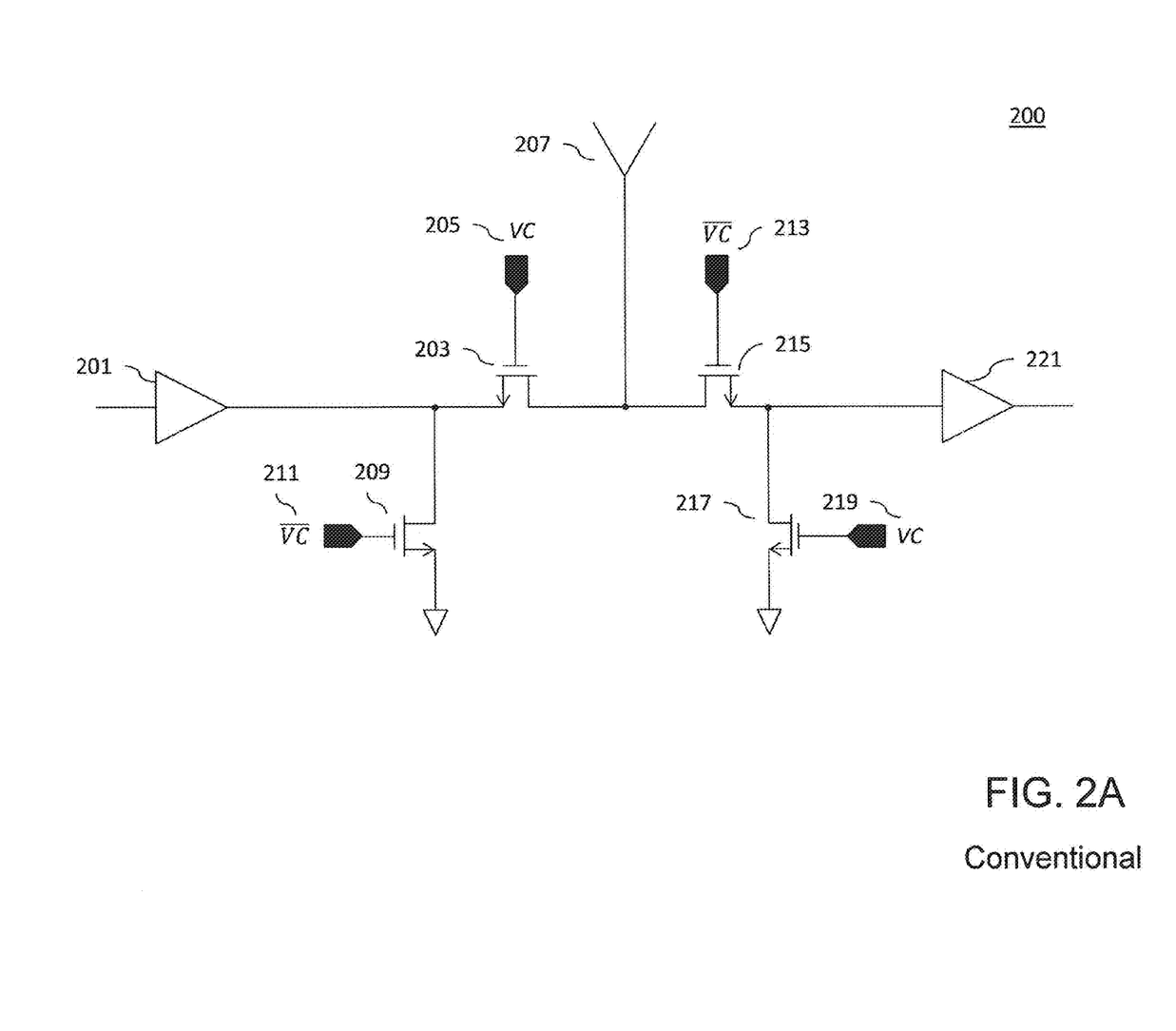
FIG. 2A illustrates a circuit including a conventional symmetry series-shunt T/R switch.

FIG. 2A illustrates a circuit 200 including a conventional symmetry series-shunt T/R switch. Circuit 200 includes power amplifier (PA) 201, low noise amplifier (LNA) 221, and antenna 207. The T/R switch can include transistors 203, 209, 215, and 217. According to one example, transistors 203, 209, 215, and 219 can include field-effect transistor (FET), such as metal-oxide-semiconductor field-effect transistor (MOSFET). However, the embodiments of this disclosure are not limited to these types of transistors.

In one example, on the transmitter side, the gate of transistor 203 is configured to receive a control signal 205 (VC). The source of transistor 203 is connected to output terminal of PA 201 and the drain of transistor 203 is connected to antenna 207. In this example, the gate of transistor 209 is configured to receive the opposite logic level of the control signal $\overline{VC}$, e.g. V. The source of transistor 209 is connected to a low voltage, such as ground. The drain of transistor 209 is connected to the output terminal of PA 201. In this example, and on the receiver side, the gate of transistor 215 is configured to receive the opposite logic level of the control signal VC, e.g. $\overline{VC}$. The source of transistor 215 is connected to input terminal of LNA 221 and the drain of transistor 215 is connected to antenna 207. In this example, the gate of transistor 219 is configured to receive the control signal VC. The source of transistor 219 is connected to a low voltage, such as ground. The drain of transistor 219 is connected to the input terminal of LNA 221.

In operation, during the transmission mode, control signal VC is high (e.g. logic high or "1") When control signal VC is high, transistors 203 and 217 are on (e.g. conducting) and transistors 209 and 215 are off. When transistors 215 is off and transistor 217 is on, the input to LNA 221 is connected to a low voltage, such as ground, and therefore, the receiver side of circuit 200 is not in operation. On the transmission side, transistor 209 is off and transistor 203 is on. Therefore, output terminal of PA 201 is connected to antenna 207. Since transistor 215 is off, the sensitive input of LNA 221 is protected from high amplitude output signal of PA 201. During the receiving mode, control signal VC is low (e.g. logic low or "0"). When control signal VC is low, transistors 203 and 217 are off and transistors 209 and 215 are on. When transistors 215 is on and transistor 217 is off, the input to LNA 221 is connected to antenna 207 and therefore, circuit 200 is configured to receive signals from antenna 207 for processing. On the transmitter side, transistor 209 is on and transistor 203 is off. Therefore, output terminal of PA 201 is connected to a low voltage, such as ground, and therefore, the transmitter side of circuit 200 is not in operation.

Circuit 200 and the T/R switch of circuit 200 provide good isolation between transmitter and receiver. However, there could be large insertion loss due to series the on-resistance of the respective series capacitors and the shunt off-capacitance. Also, circuit 200 can have a high noise figure and limited saturation output power due to low junction breakdown voltage.

Figure 2B:
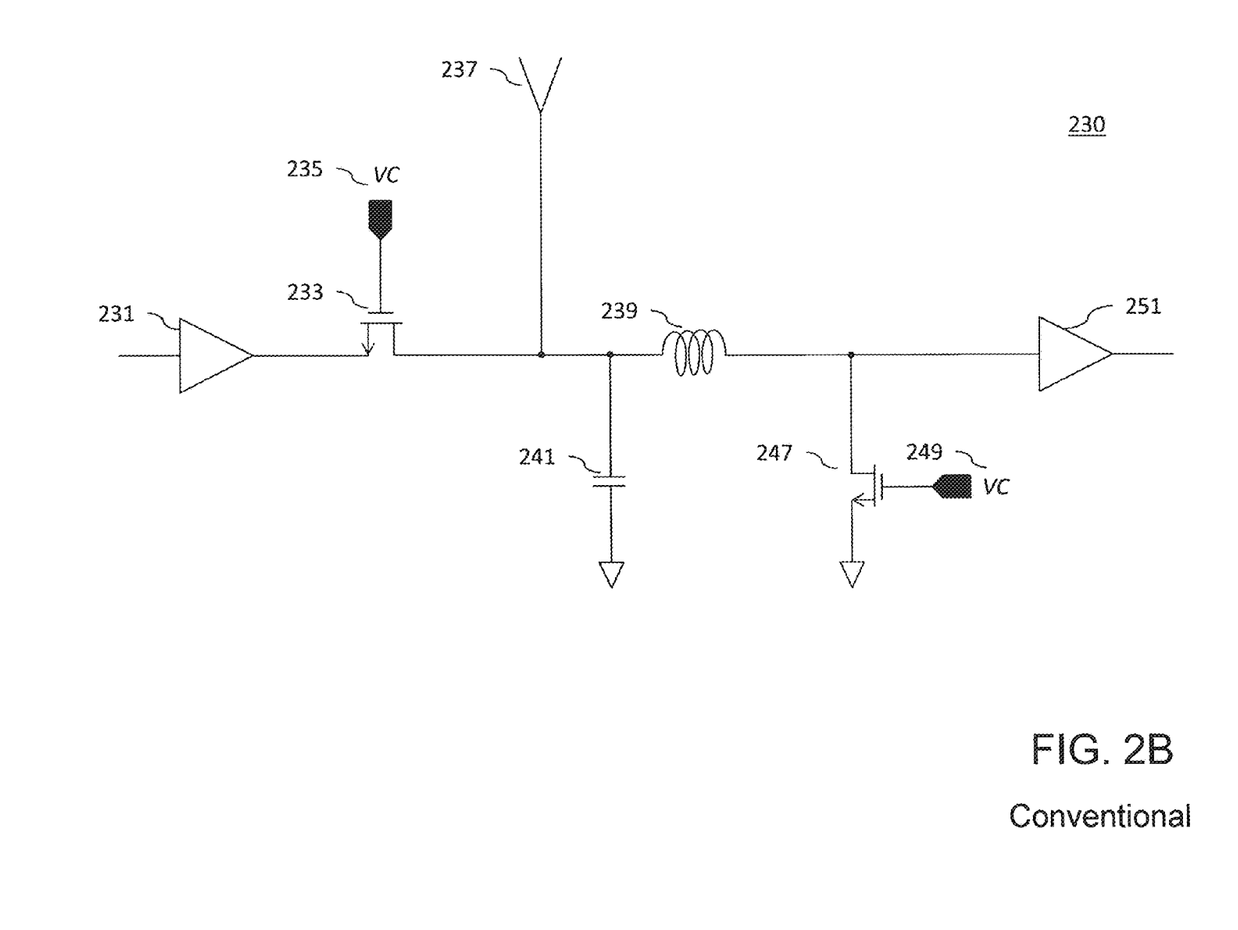
FIG. 2B illustrates a circuit including a conventional asymmetry LC-based T/R switch.

FIG. 2B illustrates a circuit 230 including a conventional asymmetry LC-based T/R switch. Circuit 230 includes power amplifier (PA) 231, low noise amplifier (LNA) 251, and antenna 237. The T/R switch can include transistors 233 and 247, inductor 239, and capacitor 241. According to one example, transistors 233 and 247 can include field-effect transistor (FET), such as metal-oxide-semiconductor field-effect transistor (MOSFET). However, the embodiments of this disclosure are not limited to these types of transistors.

In one example, on the transmitter side, the gate of transistor 233 is configured to receive a control signal 235 (VC), that operates similar to VC signal 205 in FIG. 2A. The source of transistor 233 is connected to output terminal of PA 231 and the drain of transistor 233 is connected to antenna 237. On the receiver side, one terminal of inductor 239 is connected to the input terminal of LNA 251, and the other terminal of inductor 239 is connected to antenna 237. One terminal of capacitor 241 is connected to antenna 237 and the other terminal of capacitor 241 is connected to a low voltage, such as ground. The gate of transistor 247 is configured to receive the control signal 249 (VC). The drain of transistor 247 is connected to the input terminal of LNA 251 and the source of transistor 247 is connected to a low voltage, such as ground.

In operation, during the transmission mode, control signal VC is high (e.g. logic high or "1"). When control signal VC is high, transistor 233 is on (e.g. conducting) and PA 231 is connected to antenna 237 and a signal at the input terminal of PA 231 is transmitted using antenna 237 after amplification by PA 231. When control signal VC is high, transistor 247 is on and therefore, the input terminal of LNA 251 is connected to a low voltage, such as ground. In the transmission mode, inductor 239 and capacitor 241 present a resonant open looking into inductor 239 over a frequency band of interest, thus the output signal from PA 231 does not damage the sensitive input of LNA 251. During the receiving mode, control signal VC is low (e.g. logic low or "0"). When control signal VC is low, transistor 233 is off and therefore, the transmitter side of circuit 230 is not operational. When control signal VC is low, transistor 247 is also off and therefore, circuit 230 would be in receiving mode where capacitor 241, inductor 239, and off-capacitance of transistor 247 are used to provide input impedance matching and noise matching between antenna 237 and the input of LNA 251.

In one example, circuit 230 and its LC-based T/R switch can provide, during the transmission mode, a high output power and good linearity without an off-state switch at output node. Further, circuit 230 can provide low noise figure without a series switch (such as transistor 215 of FIG. 2A) on the LNA gate path. However, due to low quality factor of inductor 239, the parasitic resistance introduces additional loss in transmission mode and degrades output power and efficiency. Also, transistor 233 is usually implemented in deep-Nwell, which contributes additional capacitance and loss at the output node.

Figure 2C:
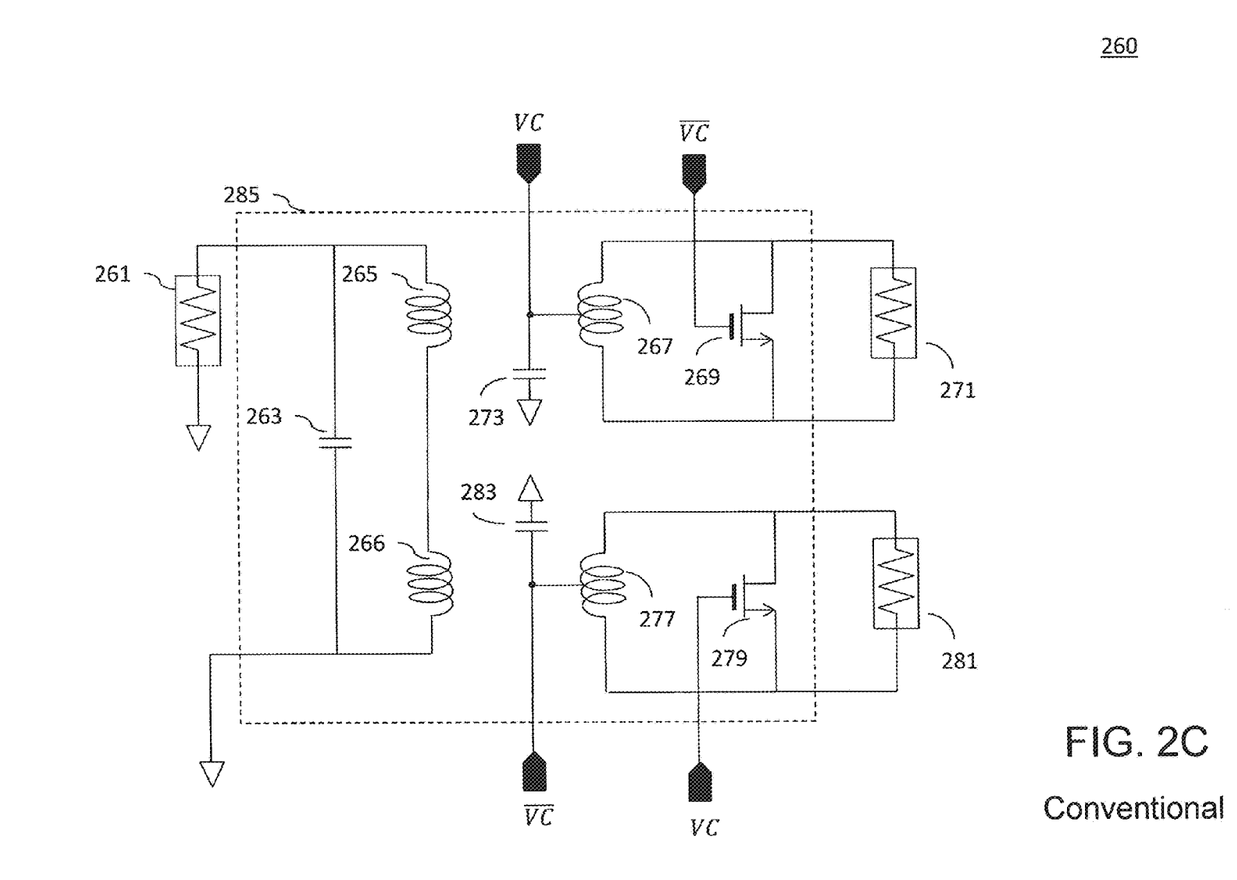
FIG. 2C illustrates a circuit including a conventional transformer-based T/R switch.

FIG. 2C illustrates a circuit 260 including a conventional transformer-based T/R switch. Circuit 260 includes transmitter circuit 271, receiver circuit 281, antenna circuit 261, and T/R switch 285. The T/R switch 285 can include a transformer including primary windings 267 and 277 and secondary windings 265 and 266. The T/R switch can include capacitances 263, 273, and 283, and transistors 269 and 279. According to one example, transistors 269 and 279 can include field-effect transistor (FET), such as metal-oxide-semiconductor field-effect transistor (MOSFET). However, the embodiments of this disclosure are not limited to these types of transistors.

In one example, a first terminal of antenna circuit 261 can be connected to a low voltage, such as ground and a second terminal of antennae circuit 261 can be connected to T/R switch 285. A first terminal of capacitor 263 is connected to the second terminal of antenna circuit 261 and the second terminal of capacitor 263 is connected to a low voltage, such as ground. In this example, the first terminal of secondary winding 265 is connected to the second terminal of antenna circuit 261 and the second terminal of secondary winding 265 is connected to a first terminal of secondary winding 266. The second terminal of secondary winding 266 is connected to a low voltage, such as ground.

On the other side of the T/R switch 285, the primary winding 267 is connected in parallel with transistor 269 and transmitter circuit 271. The drain of transistor 269 is connected to the first terminal of primary winding 267 and the source of transistor 269 is connected to the second terminal of primary winding 267. The gate of transistor 269 is configured to receive the opposite logic level of the control signal VC, e.g. $\overline{VC}$. The primary winding 267 is also connected to a first terminal of capacitor 273. The first terminal of capacitor 273 is configured to receive the control signal (VC). The second terminal of capacitor 273 is connected to a low voltage, such as ground. The primary winding 277 is connected in parallel with transistor 279 and transmitter circuit 281. The drain of transistor 279 is connected to the first terminal of primary winding 277 and the source of transistor 279 is connected to the second terminal of primary winding 277. The gate of transistor 279 is configured to receive the control signal (VC). The primary winding 277 is also connected to a first terminal of capacitor 283. The first terminal of capacitor 283 is configured to receive the opposite logic level of the control signal VC, meaning $\overline{VC}$. The second terminal of capacitor 283 is connected to a low voltage, such as ground.

In operation, during the transmission mode, control signal VC is high (e.g. logic high or "1"). When control signal VC is high, transistor 269 of the transmitter side is off and transistor 279 of the receiver side is on. When transistor 279 is on (e.g. conducting), the terminals of receiver circuit 281 are connected to each other (e.g. shorted together) and therefore, receiver circuit 281 is not operational, since it represents a differential input. On the other hand, with transistor 269 being off, primary winding 267 are connected to transmitter circuit 271 and therefore, circuit 260 can be used to transmit a signal from transmitter circuit 271 on antenna circuit 261 via the secondary windings 265 and 266. Single-ended to differential conversion is embedded in the T/R switch 285, as the antenna 261 is singled ended and both the transmitter circuit 271 and the receiver circuit 281 are differential. When control signal VC is high, a voltage is applied to primary winding 267 that can be used by transmitter circuit 271, for example, as a bias voltage. During the receiving mode, control signal VC is low (e.g., logic low, or "0") When control signal VC is low, transistor 269 of the transmitter side is on (e.g. conducting) and transistor 279 of the receiver side is off. When transistor 269 is on, the terminals of transmitter circuit 271 are connected to each other (e.g. shorted together) and therefore, transmitter circuit 271 is not operational, since the circuit has a differential output. On the other hand, with transistor 279 being off, primary winding 277 is connected to receiver circuit 261 and therefore, circuit 260 can be used to receive a signal from antenna 261 on receiver circuit 281. When control signal VC is low, a voltage is applied to primary winding 277 that can be used by receiver circuit 281, for example, as a bias voltage.

In this example, a balun and T/R switch are achieved simultaneously with high isolation between transmitter and receiver and with no series switch on signal path, and therefore providing high linearity. However, there can be a high insertion loss in both transmission mode and receiving mode, because, for example, switches (transistors) 269 and 279 are not ideal and would not provide ideal open circuit or short circuit.

Figure 3:
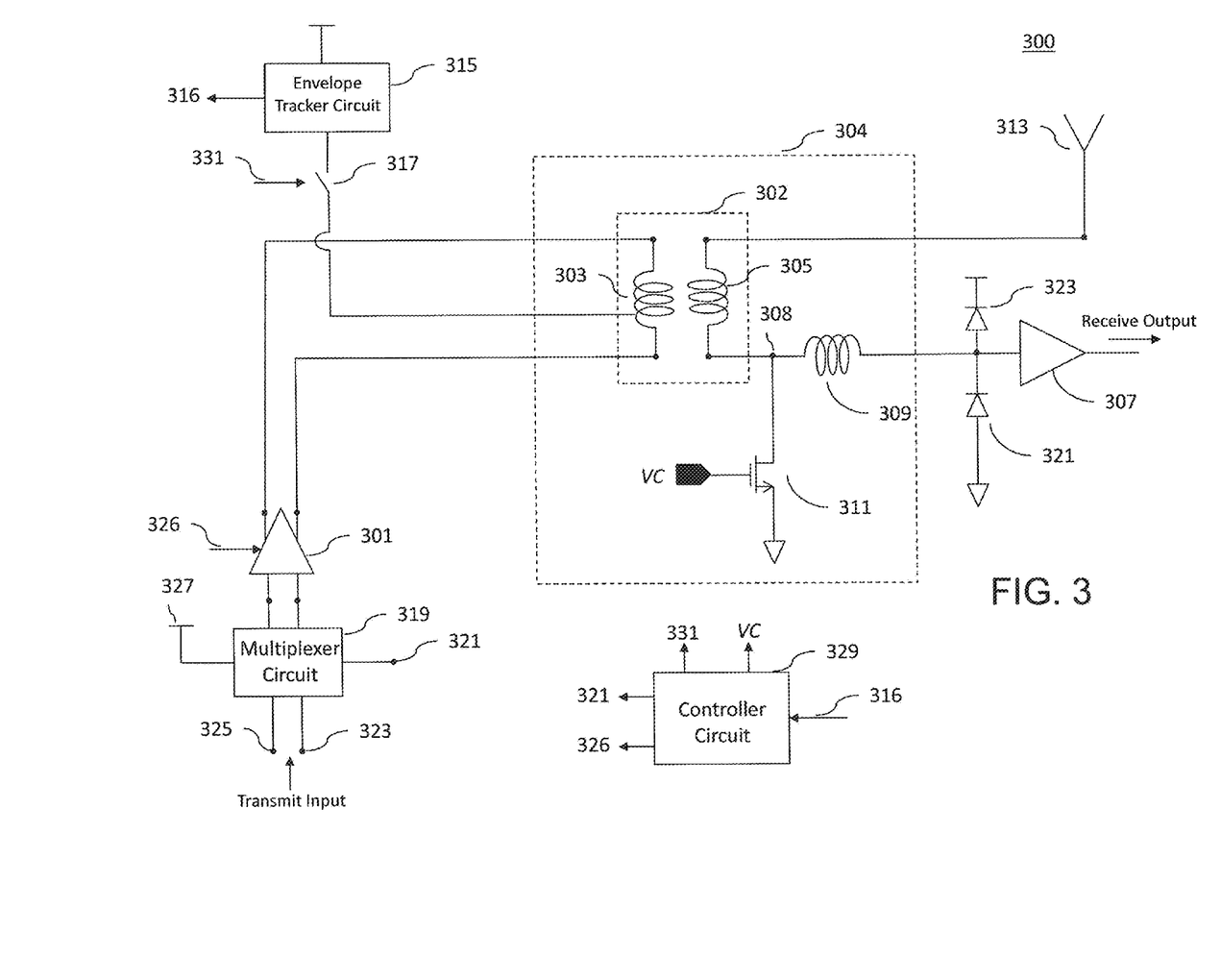
FIG. 3 illustrates a circuit that includes a T/R switch with PA transformer reuse, in accordance with an embodiment of the present disclosure.

FIG. 3 illustrates a front-end circuit 300 that includes a T/R switch with PA transformer reuse, in accordance with an embodiment of the present disclosure. Front-end circuit 300 can include a T/R switch 304, a power amplifier (PA) 301, an antenna 313, a low noise amplifier (LNA) 307, a multiplexer 319, and an envelope tracker (ET) circuit or PALDO 315. In one example, T/R switch 304 of circuit 300 can include a transformer 302 including primary winding 303 and secondary winding 305, transistor 311, and inductor 309. In one example, T/R switch 304 of circuit 300 can be part of T/R switch 117 of FIG. 1. According to one example, transistor 211 is a field-effect transistor (FET), such as metal-oxide-semiconductor field-effect transistor (MOSFET). However, the embodiments of this disclosure are not limited to these types of transistors.

Referring to FIG. 3, input terminals 323 and 325 of multiplexer 319 provide a differential input that receives a differential input signal for transmission by circuit 300 when circuit 300 is in transmit mode. The differential input terminals of PA 301 are connected to the differential output of multiplexer 319. Multiplexer 319 is configured to select the input signals that provided to PA 301, where the input signals depend on whether circuit 300 is operating as a transmitter or a receiver. For example, when circuit 300 is operating as a transmitter, multiplexer 319 is configured to connect the differential input signals on input terminals 323 and 325 to the differential input of the PA 319. However, if circuit 300 is operating as a receiver, multiplexer 319 is configured to connect both of the differential input terminals of PA 301 to a signal high 327, such as voltage VDD, which is a constant voltage. Accordingly, during receive mode, the differential input of PA 301 receives a constant DC voltage. In one example, a control signal on terminal 321 of multiplexer 319 can select the input signals to be provided by PA 301 depending on whether circuit 300 is operating as a transmitter or a receiver. The control signal on terminal 321 of multiplexer 319 can be provided by controller circuit 329, which determines whether the front-end circuit 300 is in transmit mode or receive mode.

The differential output terminals of PA 301 are directly connected to primary winding 303 of the transformer 302, so that the differential output terminals of the PA 301 are effectively the terminals of the primary winding 303. The secondary winding 305 of the transformer 302 is connected to antenna 313 and LNA 307 (through inductor 309). In one example, LNA 307 includes an amplifier configured to amplify a low-power (or very low-power) signal without affecting its signal to noise ratio significantly.

In one example, the transformer 302 including primary and secondary windings 303 and 305 is a transformer separate from PA 301. Alternatively or additionally, the transformer 302 including primary and secondary windings 303 and 305 is part of PA 301, as a power amplifier can often require or utilize an output for transformer for impedance matching and/or isolation. Accordingly, the T/R switch of circuit 300 can reuse a transformer of PA 301. In this example, the power amplifier is connected to antenna 313 because the transformer including primary and secondary windings 303 and 305 is part of the power amplifier 301.

A first terminal of secondary windings 305 is connected to antenna 313. A second terminal of secondary windings 305 is connected to drain of transistor 311 and a first terminal of inductor 309 at node 308. The source of transistor 311 is connected to a low voltage, such as ground. The gate of transistor 311 is configured to receive the control signal (VC), so that the transistor operates as controllable switch to ground. In one example, control signal (VC) is provided by controller circuit 329. The second terminal of inductor 309 is connected to input terminal of LNA 307. Two diodes 321 and 323 are connected to input terminals of LNA 307, and are configured to protect LNA 307 against electrostatic-discharge (ESD). In one example, the anode of diode 321 is connected to a low voltage, such as ground and the cathode of diode 321 is connected to input terminal of LNA 307. In this example, the anode of diode 323 is connected to input terminal of LNA 307 and the cathode of diode 323 is connected to a signal high, such as VDD. Although the protection circuit is shown as two diodes in parallel, it is noted that the embodiments of this disclosure are not limited to this configuration and other protection circuits such as ESD protection circuits, as known to a person of ordinary skill in the art, can be used.

An envelope tracker circuit 315 is connected to primary winding 303 through switch 317, where the envelope tracker circuit 315 is configured to track the amplitude envelope of the signal transmitted from PA 301 using the connection with primary winding 303. The envelope tracker circuit 315 can be used to provide feedback 316 to controller circuit 329. Controller circuit 329 can adjust a power supply voltage 326 applied to the PA 301 so as to match increasing or decreasing input signal amplitude, which will reduce output signal clipping in the case of increasing signal amplitude, or save DC power dissipation in the case of decreasing signal amplitude.

According to one example, primary and secondary windings 303 and 305 can include conductors wound in coils around a core (e.g. an iron core). For example, primary and secondary windings 303 and 305 can be two coils that overlap and are inductively coupled together. However, it is noted that primary and secondary windings 303 and 305 can be designed and implemented in other ways as will be known to a person of ordinary skill in the art. The number of turns of the conductors in each of primary and secondary windings 303 and 305 (and therefore, their turn ratio) can depend on the design of circuit 300. For example, the number of turns of the conductors in each of primary and secondary windings 303 and 305 can depend on the power produced by PA 301 and the power needed to be applied to antenna 313. In another example, the number of turns of the conductors in each of primary and secondary windings 303 and 305 can depend on the impedance of PA 301 (which can be low impedance) and on the impedance of antenna 313 (which can be a higher impedance). In one example, secondary winding 305 can have more turns than the primary winding 303 to step up the impedance from the low impedance of the PA to match the higher impedance of the antenna.

In operation, during the transmit mode, control signal VC is a logic high, e.g. "1". When control signal VC is high, transistor 311 is "on" (e.g. conducting) and node 308 is pulled to a low voltage, such as ground. Therefore, the input to LNA 307 is grounded, and has substantially zero voltage swing at its input. Thus, the receiver side (namely LNA 307 and subsequent components) of circuit 300 is not operational and the T/R switch 304 operates in transmit mode. Further, during the transmit mode, the switch 317 is closed and therefore, envelope tracker circuit 315 is connected to primary winding 303 at its center tap so as to measure the instantaneous voltage of the output of the power amplifier 301. In one example, controller circuit 329 provides a control signal 331 that controls switch 317. Further, during the transmit mode, multiplexer 319 is configured to connect the differential input signals received at input terminals 323 and 325 to the differential input terminals of PA 301 so that the differential inputs signals are transmitted using circuit 300. The differential output of PA 301 is coupled to antenna 313 using the primary and secondary windings 303 and 305 of the transformer 302. The transformer 302 operates as a "balun" so as to perform a differential to single-ended conversion to apply the differential signal from the output of the PA 301 to the single-ended input of the antenna 313. It is noted that no series switch is utilized, so as to reduce any signal loss caused by parasitic resistance or capacitance.

During the receive mode, control signal VC is a logic low (e.g. '0') and the envelope tracker circuit 315 is disconnected from primary winding 303 by opening switch 317. Further, during the receiving mode, the control signal on control terminal 321 causes the multiplexer 319 to select the high signal 327 and therefore connect both of the differential input terminals of PA 301 to the high signal 327, which can be a constant voltage, such as VDD. When the input terminals of PA 301 are both connected to the same high signal (or any constant voltage), such as VDD, then the input of the PA 301 is virtually "shorted" together because there is no differential input signal. Accordingly, PA 301 will provide a common DC output voltage (e.g. 0 volts) on both of its differential output terminals that are connected to the transformer 302. Stated another way, both components of the differential output signal of the PA 301 are the same DC voltage, so the output of the PA 301 is also virtually shorted from a differential perspective. Accordingly, equal or almost equal voltages exist on the two terminals of primary winding 303 and therefore, the secondary winding 305 would likewise provide a short circuit between its corresponding terminals. Further, since control signal VC is low, transistor 311 is off so that node 308 isolated from ground. Therefore, the first terminal of inductor 309 (at node 309) would be connected to antenna 313 through the short circuit provided by secondary winding 305, and the second terminal of inductor 309 is connected to the input of LNA 307. Therefore, LNA 307 can receive and process any input signal received from by antenna 313 in the receive mode with minimal series resistance or added noise, as no series switch is utilized.

Still referring to FIG. 3, the short circuit on primary and secondary windings 303 and 305 can be almost ideal such that the first terminal of inductor 309 at node 308 is directly connected to antenna 313. Alternatively, the short circuit on primary and secondary windings 303 and 305 is not ideal, therefore, the first terminal of inductor 309 at node 308 will be connected to antenna 313 through a residual inductance of the transformer 302 (e.g. the residual inductance of secondary winding 305). This residual inductance and inductor 309 can be configured to provide input impedance matching between the antenna 313 and the input of LNA 307 (e.g., to match a receiver including LNA 307 coupled to T/R switch 304 to antenna 313). In one example, for a frequency of 50 GHz, where the transformer has no residual inductance, inductor 309 can have an inductance of 1-2 nH. However, if the short circuit on primary and secondary windings 303 and 305 is not ideal, the inductance of inductor 309 can be reduced to approximately half (0.5-1 nH) because of the residual inductance of the transformer 302. In other words, the non-ideal nature of the transformer 302 can be used to reduce the inductance of inductor 309, and therefore reduce chip surface area required to implement the inductor 309 and the overall T/R switch 304. Similar relationship can exist for other frequencies.

As discussed above, in one embodiment, controller circuit 329 provides the control signal on terminal 321 of multiplexer 319, control signal (VC) to gate of transistor 311, and a control signal 331 that controls switch 317 to determine whether front-end circuit 300 is in transmit mode or receive mode. Depending on the feedback 316 of envelope tracker circuit 315, controller circuit 329 may also adjust the power supply voltage 326 applied to PA 301 as discussed above.

According to one example, the embodiments of FIG. 3 can reuse the transformer of PA 301 in T/R switch 304. In other words, the output of PA 301 can typically use a transformer for impedance matching or isolation, and therefore the transformer 302 can provide both the functions of transformer 302 and the output transformer of the PA 301.

Further, in embodiments, the T/R switch 304 can use only one transistor 311 so as to provide a low insertion loss when in transmit mode, such as, but not limited to, 0.2-0.3 dB. For example, with transistor 311 pulling the input of LNA 307 to ground at node 308, there is no parasitic or leakage path introduced by T/R switch 304 at the input of antenna 313. Also, only transistor 311 has its source connected to ground and therefore the parasitic capacitance due to the transistor 311 is shorted to ground and therefore will have minimal effect on bandwidth. The T/R switch 304 of circuit 300 can also have a high linearity since only one transistor 311 is used in the T/R switch so that parasitic capacitance is reduced. Also, T/R switch of circuit 300 can use smaller chip area compared to conventional designs, since the residual inductance of the transformer 302 can be used to supplement the inductance of inductor 309 for the LNA 307 so that the actual inductance of inductor 309 is smaller compared to conventional designs. Further, the T/R switch of circuit 300 can have a good noise figure during receive mode as the strong PA 301 can provide fairly good short, so that the transformer 302 contributes little noise to the input of LNA 307.

Figure 4:
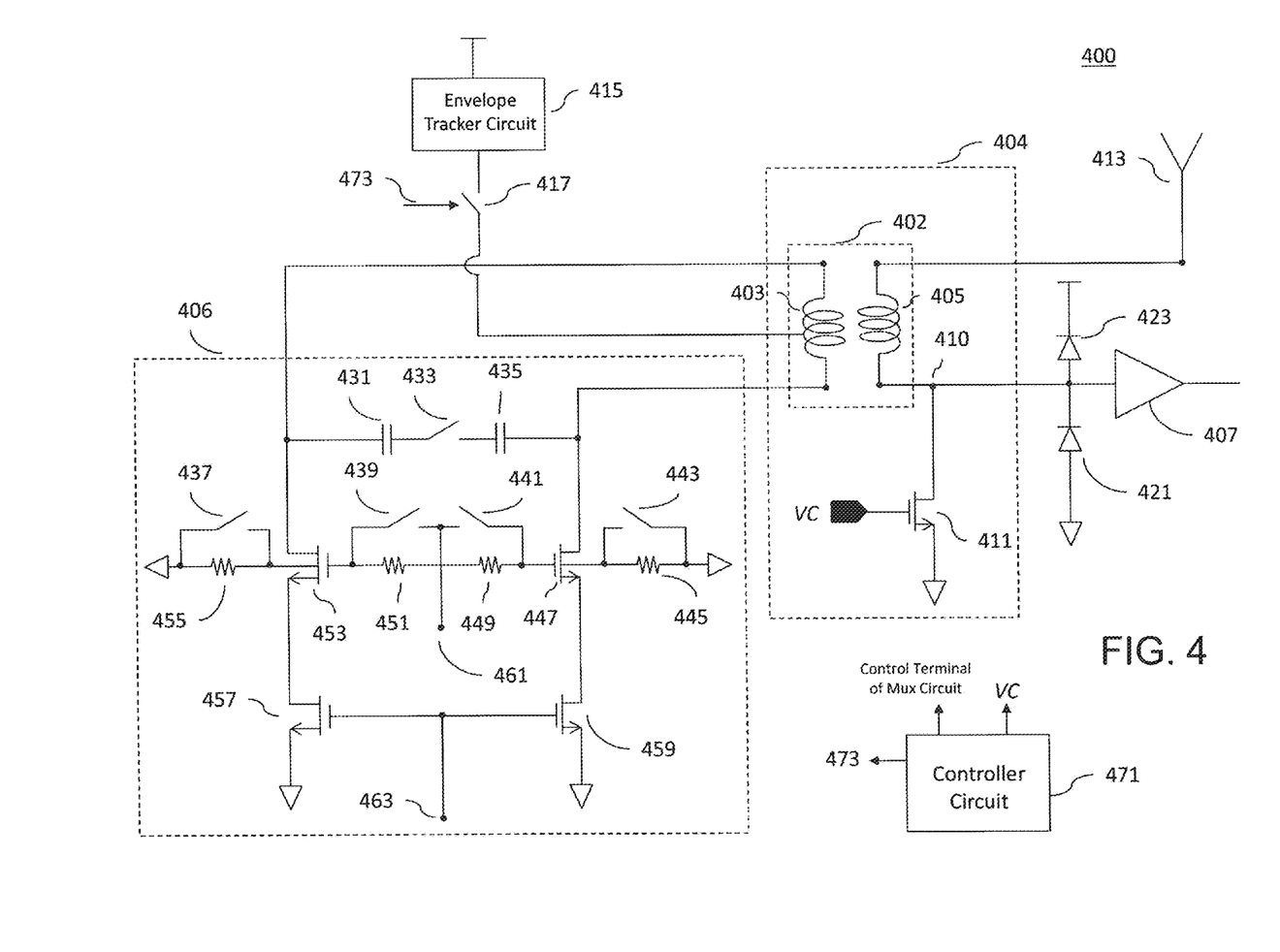
FIG. 4 illustrates a circuit that includes a T/R switch with PA transformer reuse, in accordance with another embodiment of the present disclosure.

FIG. 4 illustrates a front-end circuit 400 that includes a T/R switch with PA transformer reuse, in accordance with another embodiment of the present disclosure. Front-end circuit 400 can include a T/R switch 404, a power amplifier (PA) 406, an antenna 413, a low noise amplifier (LNA) 407, and an envelope tracker (ET) circuit or PALDO 415. In one example, T/R switch 404 can include a transformer 402 including primary winding 403 and secondary winding 405, and transistor 411. In one example, T/R switch 404 can be part of T/R switch 117 of FIG. 1. According to one example, transistor 411 can include field-effect transistor (FET), such as metal-oxide-semiconductor field-effect transistor (MOSFET). However, the embodiments of this disclosure are not limited to these types of transistors, as other types of transistors can be used as will be understood by those skilled in art.

In comparison with FIG. 3, circuit 400 of FIG. 4 illustrates elements of the power amplifier 406 including, for example, capacitors 431 and 435, resistors 445, 449, 451, and 455, switches 433, 437, 439, 441, and 443, and transistors 447, 453, 457, and 459. Also, the T/R switch of circuit 400 does not include inductor 309 of circuit 300 of FIG. 3. Also, although not shown, circuit 400 can include a multiplexer (such as multiplexer 319 of FIG. 3) connected to input terminals 461 and 463 of the power amplifier.

In operation, during the transmission mode, control signal VC is a logic high (e.g. "1"). When control signal VC is a logic high, transistor 411 is on and node 410 at the drain of transistor 411 is pulled to a low voltage, such as ground. Therefore, the input to LNA 407 is grounded and therefore "sees" almost zero voltage swing. Thus, the receiver side (namely LNA 407) of circuit 400 is not operational. In this example, T/R switch 404 operates in transmit mode. Further, during the transmit mode, the switch 417 is closed and therefore, envelope tracker circuit 415 is on, so as to measure the instantaneous voltage of the output of the PA 406 at the center tap of the primary coil 403 in order to track the amplitude envelope of the PA output signal. The output of PA 406 is sent to antenna 413 using the primary and secondary windings 403 and 405 of the transformer 402. In one example, the transformer 402 including primary and secondary windings 403 and 405 is a transformer separate from PA 406. Alternatively or additionally, the transformer 402 including primary and secondary windings 403 and 405 is a transformer that is part of the PA 406 as described above for front-end circuit 300. Accordingly, T/R switch 404 reuses the PA's transformer. Stated another way, the transformer 402 is both the output transformer of PA 406 and the transformer of T/R switch 404. In this example, the PA 406 is connected directly to antenna 413 because the transformer 402 including primary and secondary windings 403 and 405 is part of the PA 406, without an intervening series switch. During the transmission mode, switches 433, 437, 439, 441, and 443 of PA 406 are closed.

During the receiving mode, control signal VC is a logic low (e.g. "0") and the envelope tracker circuit 415 is disconnected from primary winding 403 by opening switch 417. Also, during the receiving mode, switches 433, 437, 439, 441, and 443 are all open (off) so that the parasitic capacitance associated to the transformer's PA side (e.g., attached to primary winding 403) is minimized. During the receiving mode, the input terminals 461 and 463 that make up the differential input of the PA 406 are open (e.g. open circuited). Since the input of PA 406 is open circuited, then the output of PA 406 will also reflect an open-circuit, so that the terminals of primary winding 403 also reflect an open circuit. When the terminals of primary winding 403 are at open an circuit, then the secondary side antenna 413 only "sees" an inductor 405. In this case, at the antenna side of the transformer 402, the secondary winding 405 would provide the inductance necessary for input impedance matching and noise matching to match the input of the LNA 407 to the antenna 413. Therefore, inductor 309 of circuit 300 of FIG. 3 can be eliminated as shown. In this example, the T/R switch operates as a receive switch.

Although not shown, circuit 400 can include a multiplexer such as multiplexer 319 of FIG. 3. In one example, the differential input terminals 461 and 463 of PA 406 are connected to the output of the multiplexer, similar to the configuration of FIG. 3. The multiplexer is configured to select the input signals provided to the PA 406, depending on whether circuit 400 is operating as a transmitter or a receiver. For example, when circuit 400 is operating as a transmitter, the multiplexer is configured to connect the differential input terminals 461 and 463 of PA 406 to the differential input signals on input terminals of the multiplexer that are being transmitted using circuit 400. However, if circuit 400 is operating as a receiver, the multiplexer is configured to make the differential input terminals 461 and 463 of PA 406 open (at open circuit). In one example, a control signal on a terminal of the multiplexer can select the input signals to the PA depending on whether circuit 400 is operating as a transmitter or a receiver. Further, the controller circuit 471 provides a control signal on a control terminal of the multiplexer (such as terminal 321 of multiplexer circuit 319 of FIG. 3) to control the input signal selection. Controller circuit 471 also provides control signal (VC) to gate of transistor 411 and a control signal 473 that controls switch 417.

According to one example, primary and secondary windings 403 and 405 can include conductors wound in coils around a core (e.g. an iron core). For example, primary and secondary windings 403 and 405 can be two coils that overlap and are inductively coupled together. However, it is noted that primary and secondary windings 403 and 405 can be designed and implemented in other ways as will be known to a person of ordinary skill in the art. The number of turns of the conductors in each of primary and secondary windings 403 and 405 (and therefore, their turns ratio) can depend on the specific design of circuit 400. For example, the number of turns of the conductors in each of primary and secondary windings 403 and 405 can depend on the power produced by PA 406 and the power needed to be applied to antenna 413. In another example, the number of turns of the conductors in each of primary and secondary windings 403 and 405 can depend on the impedance of the PA (which can be low impedance) and the impedance of antenna 413 (which can be a higher impedance). In one example, secondary winding 405 can have more turns than primary winding 403 to step up the impedance from the PA's low impedance to the antenna's higher impedance. However, secondary winding 405 can have less than or equal turns compared to primary winding 403, based on the design of circuit 400.

According to one example, the embodiments of FIG. 4 can reuse the transformer of the PA in the T/R switch and can have the terminals of the transformer's PA side open to use the circuit as the receiver as described above. In one example, T/R switch 404 can use smaller chip area than conventional designs. For example, the inductance of the transformer on antenna side is used as the inductance for the LNA 407 input impedance matching and noise matching, therefore saving chip area compared to conventional designs. Also, the embodiments of FIG. 4 can provide low transmit insertion loss. For example, with a transistor 411 pulling the LNA 407 input to ground at bottom side of the transformer at node 410, there is no parasitic or leakage path introduced by T/R switch 404 at the antenna node during transmit mode. Further, transistor 411 has its source connected to ground, therefore the parasitic capacitance due to the transistor is shorted to ground. Also, T/R switch 404 can have a reasonable noise figure. The LNA 407 noise figure can depend on how good the open of the transformer on PA side is. Therefore, there is a trade-off between PA performance and PA off-state parasitic capacitance.

The exemplary embodiments described herein are provided for illustrative purposes, and are not limiting. Other exemplary embodiments are possible, and modifications may be made to the exemplary embodiments within the spirit and scope of the disclosure. It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed. It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined in accordance with their recitations and their equivalents.

What is claimed is:
1. A front-end circuit of a communication device, the front-end circuit comprising:
    a power amplifier,
    a low noise amplifier; and
    a transmit/receive switch configured to provide an output signal from the power amplifier to an antenna during a transmit mode, and provide an input signal from the antenna to the low noise amplifier during a receive mode, the transmit/receive switch comprising:

a transformer including a primary winding and a secondary winding,
wherein the primary winding is directly connected to a differential output of the power amplifier, and wherein the secondary winding has a first terminal connected to the antenna and a second terminal coupled to an input of the low noise amplifier; and
a switch having a first terminal connected to the second terminal of the secondary winding and a second terminal connected to ground; and
a multiplexer, comprising:
a differential input to receive a differential input signal for transmit by the antenna during the transmit mode;
a second input connected to a direct current (DC) voltage; and
an output connected to a differential input of the power amplifier.

2. The front-end circuit of claim 1, wherein during the transmit mode, the transformer is configured to provide a differential-to-single ended conversion of the output signal of the power amplifier for transmission by the antenna.

3. The front-end circuit of claim 2, wherein during the transmit mode, the switch is configured to ground the second terminal of the secondary winding to isolate the input of the low noise amplifier from the output signal of the power amplifier during the transmit mode.

4. The front-end circuit of claim 1, wherein during the receive mode, the secondary winding is configured to provide a short circuit between the antenna and the input of the low noise amplifier, based on the output signal of the power amplifier.

5. The front-end circuit of claim 4, wherein the output signal of the power amplifier includes a first differential component and a second differential component, wherein both the first and second differential components are a same direct current (DC) voltage that is constant during the transmit mode.

6. The front-end circuit of claim 1, wherein the multiplexer is configured to select the differential input signal for output to the differential input of the power amplifier during the transmit mode, and select the DC voltage for input to the differential input of the power amplifier during the receive mode.

7. The front-end circuit of claim 1, wherein the power amplifier is configured to provide a constant DC voltage as the output signal of the power amplifier during the receive mode, causing the secondary winding to provide a short circuit between the antenna and the input of the low noise amplifier.

8. The front-end circuit of claim 1, further comprising an envelope tracker circuit selectively connected to a center tap of the primary winding through a second switch, wherein the envelope tracker circuit is configured to determine an amplitude envelope of the output signal of the power amplifier during the transmit mode.

9. The front-end circuit of claim 8, wherein the envelope tracker circuit is disconnected from the center tap by opening the second switch during the receive mode.

10. The front-end circuit of claim 8, further comprising a controller circuit configured to provide a first control signal and a second control signal to control respectively the first switch and the second switch, wherein the first control signal closes the first switch and the second control signal closes the second switch during the transmit mode, and wherein the first control signal opens the first switch and the second control signal opens the second switch during the receive mode.

11. The front-end circuit of claim 10, wherein the controller is further configured to receive the amplitude envelope of the output signal of the power amplifier during the transmit mode, and provide a third control signal to control a supply voltage to the power amplifier based on the amplitude envelope so that the supply voltage increases when the amplitude envelope increases.

12. The front-end circuit of claim 1, further comprising an inductor connected between the second terminal of the secondary winding and the input of the low noise amplifier, the inductor having an inductance configured to provide an impedance match between the input of the low noise amplifier and the antenna during the receive mode.

13. The front-end circuit of claim 12, wherein the inductance of the inductor is based on a residual inductance of the secondary winding.

14. The front-end circuit of claim 1, wherein at least the primary winding of the transformer is shared as an output component of the power amplifier to provide an impedance match for the power amplifier.

15. A front-end circuit of a communication device, the front-end circuit comprising:
a transmit/receive switch configured to provide an output signal from a power amplifier to an antenna during a transmit mode, and provide an input signal from the antenna to a low noise amplifier during a receive mode, the transmit/receive switch comprising:
a transformer including a primary winding and a secondary winding, wherein the primary winding is directly connected to a differential output of the power amplifier, and wherein the secondary winding has a first terminal connected to the antenna and a second terminal coupled to an input of the low noise amplifier; and
a switch having a first terminal connected to the second terminal of the secondary winding and a second terminal connected to ground; and
a multiplexer configured to select between a differential input signal received at a first input and a direct current (DC) voltage received at a second input, to provide a selected signal to an input of the power amplifier,
wherein, during the transmit mode, the multiplexer is configured to select the differential input signal at the first input as the selected signal provided to the input of the power amplifier, and
wherein, during the receive mode, the multiplexer is configured to select the DC voltage at the second input as the selected signal provided to the input of the power amplifier.

16. The front-end circuit of claim 15, wherein the switch is closed during the transmit mode and open during the receive mode, wherein the closed switch during the transmit mode pulls the second terminal of the secondary winding to ground so as to isolate the input of the low noise amplifier from the output signal of the power amplifier during the transmit mode.

17. The front-end circuit of claim 15, wherein the input of the power amplifier is differential having first and second terminals, and wherein the DC voltage is applied to both of the first and second terminals of the power amplifier during the receive mode, causing a short circuit to appear across the primary and secondary windings of the transformer.

18. The front-end circuit of 15, wherein at least the primary winding of the transformer is shared as an output component of the power amplifier to provide an impedance match for the power amplifier.

19. The front-end circuit of claim 15, wherein during the receive mode, the secondary winding maintains a residual inductance, the front-end circuit further comprising:
- an inductor connected between the second terminal of the secondary winding and the input of the low noise amplifier, the inductor having an inductance configured, in combination with the residual inductance, to provide an impedance match between the input of the low noise amplifier and the antenna during the receive mode.

20. The front-end circuit of claim 15, further comprising:
- an envelope tracker circuit connected to a center tap of the primary winding, wherein the envelope tracker circuit is configured to determine an amplitude envelope of the output signal of the power amplifier during the transmit mode; and
- a controller configured to receive the amplitude envelope of the output signal of the power amplifier during the transmit mode, and to control a supply voltage to the power amplifier based on the amplitude envelope.

* * * * *